US 8,844,971 B2

(12) United States Patent
Tanaka et al.

(10) Patent No.: US 8,844,971 B2
(45) Date of Patent: Sep. 30, 2014

(54) VEHICLE BODY STRUCTURE FOR AUTOMOBILE

(75) Inventors: Hirofumi Tanaka, Wako (JP); Satoru Yamaguchi, Tokyo (JP)

(73) Assignee: Honda Motor Co., Ltd, Tokyo (JP)

( * ) Notice: Subject to any disclaimer, the term of this patent is extended or adjusted under 35 U.S.C. 154(b) by 233 days.

(21) Appl. No.: 13/557,561

(22) Filed: Jul. 25, 2012

(65) Prior Publication Data

US 2013/0026746 A1 Jan. 31, 2013

(30) Foreign Application Priority Data

Jul. 30, 2011 (JP) ................................. 2011-167857

(51) Int. Cl.
*B62D 25/18* (2006.01)
*B62D 25/16* (2006.01)

(52) U.S. Cl.
CPC ............ *B62D 25/182* (2013.01); *B62D 25/161* (2013.01)
USPC ............................ 280/851; 280/847; 280/848

(58) Field of Classification Search
CPC .... B62D 25/182; B62D 25/161; B62D 25/16; B62D 25/18; B62D 25/184; B62D 25/186; B62D 25/188; B62D 25/168
USPC ......... 280/847, 848, 849, 850, 851, 853, 159, 280/160; 296/198
See application file for complete search history.

(56) References Cited

U.S. PATENT DOCUMENTS

| | | | | |
|---|---|---|---|---|
| 4,440,438 A * | 4/1984 | Miyoshi et al. | ........... | 296/203.04 |
| 4,687,217 A * | 8/1987 | Stewart | ........................ | 280/848 |
| 4,735,427 A * | 4/1988 | Fuchs | ........................ | 280/847 |
| 5,094,504 A * | 3/1992 | Wurl | ........................ | 296/203.03 |
| 6,155,624 A * | 12/2000 | Bienenstein, Jr. | ............ | 296/37.1 |
| 7,207,617 B2 * | 4/2007 | Pelini | ........................ | 296/29 |
| 7,497,509 B2 * | 3/2009 | Omiya et al. | ................. | 296/198 |
| 7,810,828 B2 * | 10/2010 | Sugiyama et al. | ........ | 280/152.05 |
| 7,909,392 B2 * | 3/2011 | Takeuchi et al. | .............. | 296/198 |
| 8,146,987 B2 * | 4/2012 | Uchino | ........................ | 296/198 |
| 8,167,335 B2 * | 5/2012 | Takeuchi | ..................... | 280/851 |
| 2007/0216199 A1 * | 9/2007 | Ito et al. | ........................ | 296/198 |
| 2008/0231082 A1 * | 9/2008 | Mathew | ........................ | 296/198 |
| 2009/0256345 A1 * | 10/2009 | Tanaka et al. | ................. | 280/850 |

FOREIGN PATENT DOCUMENTS

JP 2009-061995 A 3/2009

* cited by examiner

*Primary Examiner* — J. Allen Shriver, II
*Assistant Examiner* — James M Dolak
(74) *Attorney, Agent, or Firm* — Westerman, Hattori, Daniels & Adrian, LLP

(57) ABSTRACT

An inner fender that faces a wheel arch of a bumper face includes an undercut portion formed on a side of an inner peripheral wall, the side of the inner peripheral wall being an outer side with respect to a vehicle width direction. The undercut portion includes a lower side wall that radially inwardly recedes from the inner peripheral wall and is superposed with a lower end of the wheel arch of the bumper face, an upper side wall that radially outwardly protrudes from the inner peripheral wall and is disposed above the lower side wall so as to be continuous with the lower side wall, and a flange that extends outward in the vehicle width direction from a front end of the upper side wall and is secured to an inner portion of the bumper face.

4 Claims, 11 Drawing Sheets

VEHICLE BODY STRUCTURE FOR AUTOMOBILE

CROSS REFERENCES TO RELATED APPLICATIONS

The present application claims priority under 35 U.S.C. §119 to Japanese Patent Application No. 2011-167857, filed Jul. 30, 2011, entitled "Vehicle Body Structure for Automobile". The contents of this application are incorporated herein by reference in their entirety.

TECHNICAL FIELD

The present application relates to a vehicle body structure for an automobile that includes an inner fender, which is disposed on an inner side of a wheel arch of a bumper face and a wheel arch of a fender panel with respect to a vehicle width direction, so as to form a wheel housing. The wheel arch of the bumper face is continuous with the wheel arch of the fender panel so as to form a semi-circular shape, and the inner fender has an inner peripheral wall that opposes an outer peripheral surface of a tire.

BACKGROUND

A known vehicle body structure for an automobile having such an inner fender (mud guard) has been disclosed in Japanese Unexamined Patent Application Publication No. 2009-61995, the entire contents of which are incorporated herein by reference.

SUMMARY

Figure 6A:
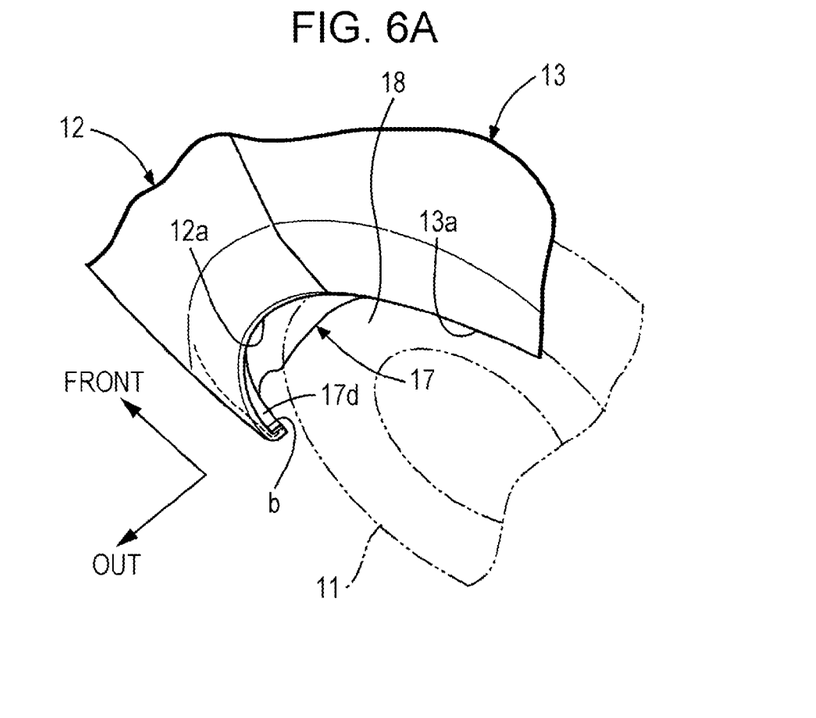
FIGS. 6A and 6B are diagrams of a structure illustrated in FIG. 1 seen from a direction indicated by an arrow VI in FIG. 1.
Figure 6B:
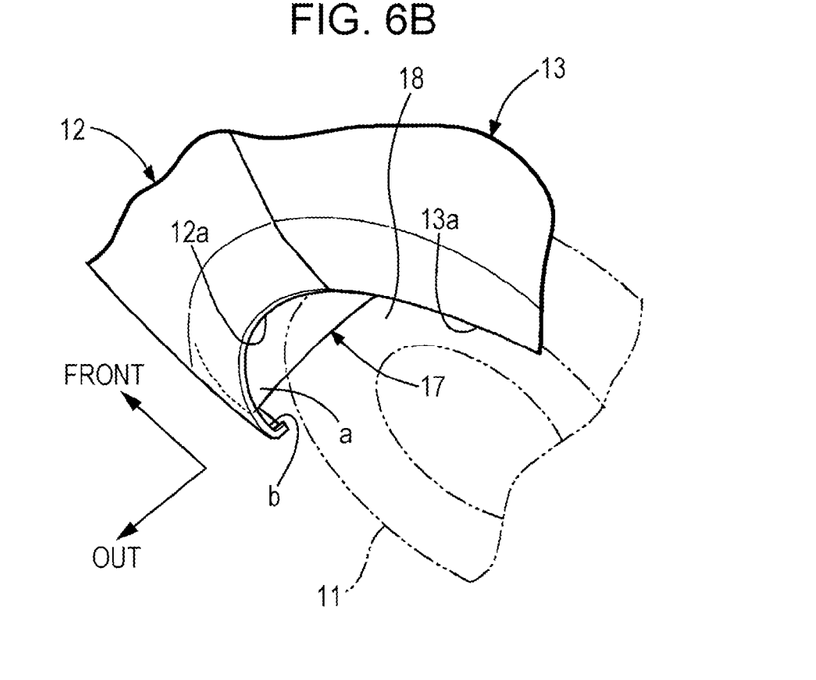

As illustrated in FIG. 6B, a lower end of a wheel arch 12a protrudes toward a rear side of a vehicle in a bumper face 12 of a front bumper in some vehicles. An inner fender 17 may be formed by injection molding using a mold including upper and lower halves. In this case, in order to match the shape of a front lower portion "a" of the inner fender 17 with the shape of the lower end of the wheel arch 12a of the bumper face 12 so as to form a protrusion that protrudes toward the rear side of the vehicle, an undercut portion is required. However, the molded part is prevented by the undercut portion from being ejected from the mold. Thus, the rearward protrusion cannot be formed and the front lower portion "a" of the inner fender 17 has to be molded along a line in an up-down direction, which is a direction in which the mold is opened. As a result, the front lower portion "a" of the inner fender 17 is made to recede toward a front side of the vehicle relative to a lower end "b" of the wheel arch 12a of the bumper face 12, which protrudes toward the rear side of the vehicle. Consequently, the thin lower end "b" of the bumper face 12 becomes directly visible, thereby degrading the appearance.

Furthermore, when a flange is formed on an outer side of the inner fender with respect to the vehicle width direction by securing this flange to an inner surface of the bumper face with clips, the clips are visible through the wheel arch, thereby degrading the appearance.

The present application has been proposed in view of the above-described situation to improve the appearance of the lower portion of the wheel arch of the bumper face.

According to an aspect of an embodiment, a vehicle body structure for an automobile is proposed. The vehicle body structure includes an inner fender disposed on an inner side of a wheel arch of a bumper face and a wheel arch of a fender panel with respect to a vehicle width direction so as to form a wheel housing. The wheel arch of the bumper face is continuous with the wheel arch of the fender panel so as to form a semi-circular shape. The inner fender has an inner peripheral wall that opposes an outer peripheral surface of a tire. In the vehicle body structure, the inner fender that faces the wheel arch of the bumper face includes an undercut portion formed on a side of the inner peripheral wall, the side of the inner peripheral wall being an outer side with respect to the vehicle width direction. The undercut portion includes a lower side wall that radially inwardly recedes from the inner peripheral wall and is superposed with a lower end of the wheel arch of the bumper face, an upper side wall that radially outwardly protrudes from the inner peripheral wall and is disposed above and continuous with the lower side wall, and a flange that extends outward in the vehicle width direction from a front end of the upper side wall and is secured to an inner surface of the bumper face.

Thus, the appearance can be improved not only by the lower end of the bumper face, the thickness of which appears thick due to the lower side wall, but also by the flange being further radially outwardly separated from the wheel arch of the bumper face by forming the upper side wall so as to decrease the visibility of a portion where the flange is secured.

In the vehicle body structure for an automobile, a mold used to form the inner fender by injection molding may include an upper half used to form an outer peripheral surface of the inner fender and includes a first slide core that is outwardly slidable, and a lower half used to form an inner peripheral surface of the inner fender and includes a second slide core that is inwardly slidable. The first and second slide cores are used to form the undercut portion. The outward and inward directions respectively correspond to forward and rearward directions of the inner fender on a vehicle.

Thus, the inner fender having the undercut portion can be formed by injection molding without problems.

In either one of the above-described vehicle body structures for an automobile, first and second ridges that extend in a circumferential direction of the wheel housing may be formed between the inner peripheral wall and the undercut portion, a lower portion of the undercut portion may radially recede further to the inside than the second ridge so as to form the lower side wall, and an upper portion of the undercut portion may radially protrude further to the outside than the first ridge so as to form the upper side wall.

Thus, the stiffness of the undercut portion can be improved by the upper and lower ridges. This can suppress the shift of the position of the lower side wall of the inner fender relative to the lower end of the wheel arch of the bumper face, thereby further improving the appearance.

In the vehicle body structure for an automobile in which first and second ridges that extend in the circumferential direction of the wheel housing are formed between the inner peripheral wall and the undercut portion, the lower portion of the undercut portion radially recedes further to the inside than the second ridge so as to form the lower side wall, and the upper portion of the undercut portion radially protrudes further to the outside than the first ridge so as to form the upper side wall, a reinforcing rib may be formed on an outer side of the lower side wall with respect to the vehicle width direction. In this case, the reinforcing rib extends downward from a position near the second ridge.

Thus, the stiffness of the lower side wall of the inner fender can be improved by the reinforcing rib, thereby more reliably suppressing formation of a gap between the lower side wall of the inner fender and the lower end of the wheel arch of the bumper face. In addition, the reinforcing rib is continuous with an area near the second ridge. Thus, the second ridge can decrease the visibility of depression of molded product formed when resin is cured due to the reinforcing rib.

An upper flange 17c that will be described in embodiments below corresponds to the flange according to the above-described aspect of the embodiment, and an upper and lower ridges L1 and L2 that will be described in the embodiments below correspond to the first and second ridges according to the above-described aspect of the embodiment.

BRIEF DESCRIPTION OF THE DRAWINGS

The advantages of the disclosure will become apparent in the following description taken in conjunction with the following drawings.

DETAILED DESCRIPTION

A first embodiment of the present application will be described below with reference to FIGS. 1 to 10.

Figure 1:
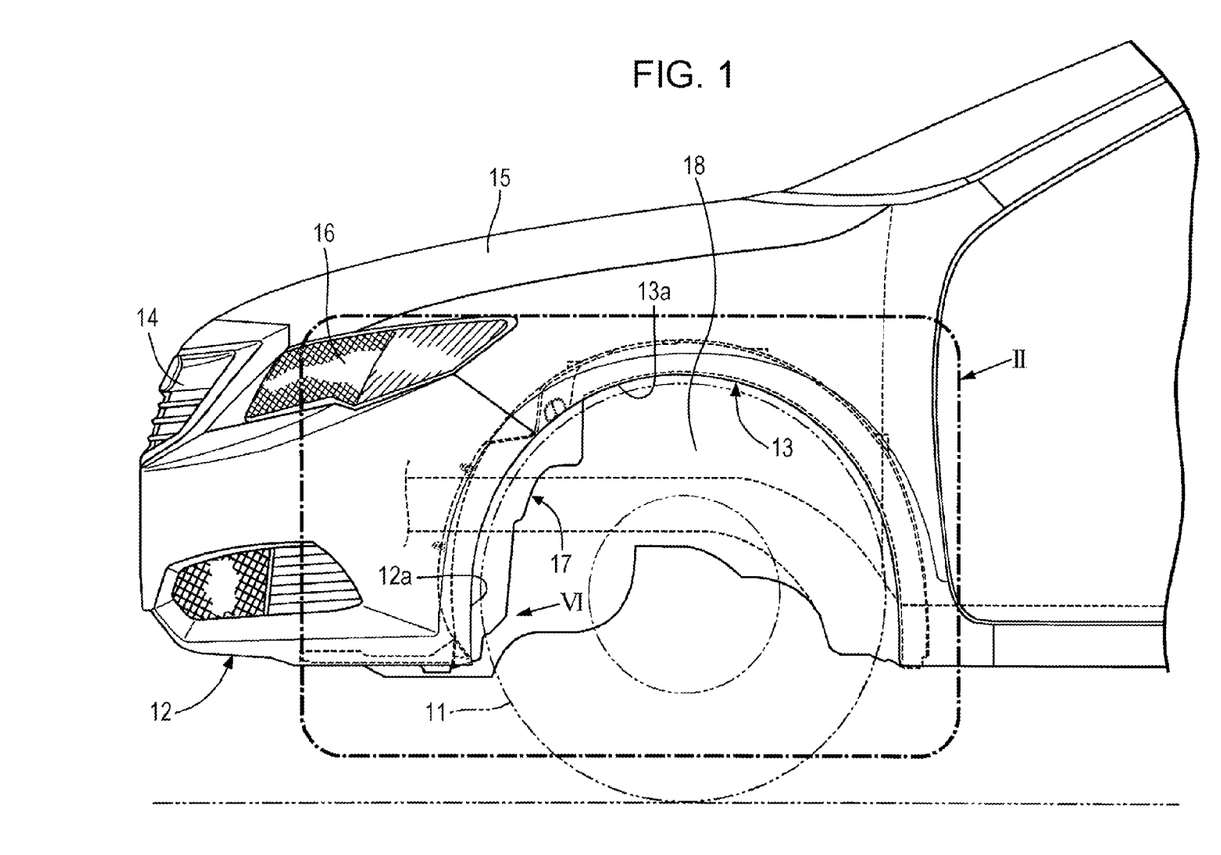
FIG. 1 is a left side view of a front portion of a vehicle body of an automobile.
Figure 2:
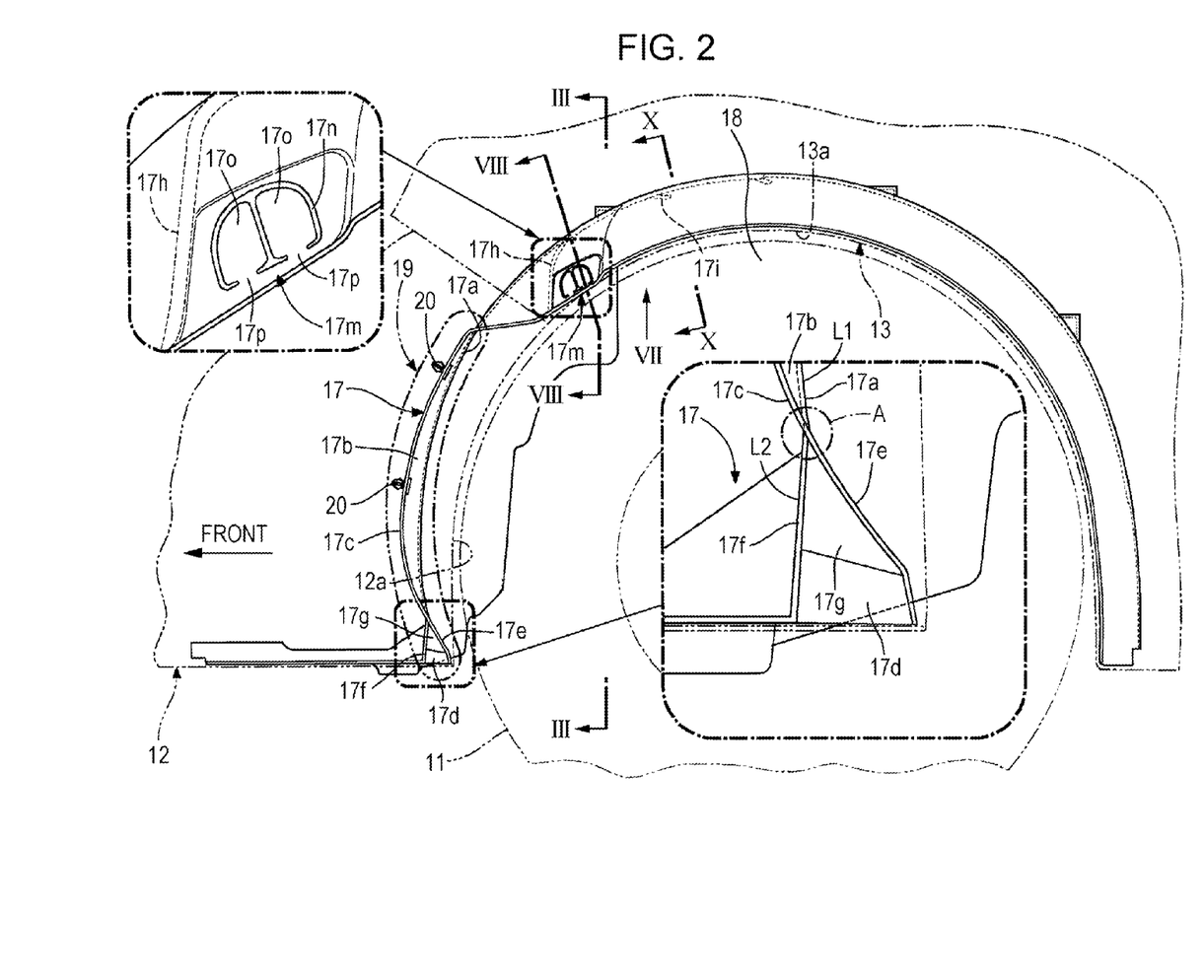
FIG. 2 is an enlarged view of part II in FIG. 1.

As illustrated in FIGS. 1 and 2, an upper half of a tire 11 for a front wheel, which is positioned at a front portion of a vehicle body of an automobile, is surrounded by a wheel arch 12a of a synthetic-resin bumper face 12 and a wheel arch 13a of a fender panel 13. The bumper face 12 is integrally formed with a front grille 14 connected to an upper portion thereof. An upper end of the fender panel 13 opposes an outer end of a bonnet 15 in the vehicle width direction. A headlight 16 is disposed at a position surrounded by the bumper face 12, the fender panel 13, the front grille 14, and the bonnet 15. An inner fender 17 formed of a soft synthetic-resin is disposed so as to be spaced apart from an outer peripheral surface of the upper half of the tire 11 by a specified gap. A wheel housing 18, which houses the tire 11, is formed on an inner side of the inner fender 17. The inner fender 17 is generally formed by injection molding using a mold including upper and lower halves. The inner fender 17 has an undercut portion 19 at a front portion thereof. In order to form the undercut portion 19 in molding, slide cores are used, as described below.

Figure 3:
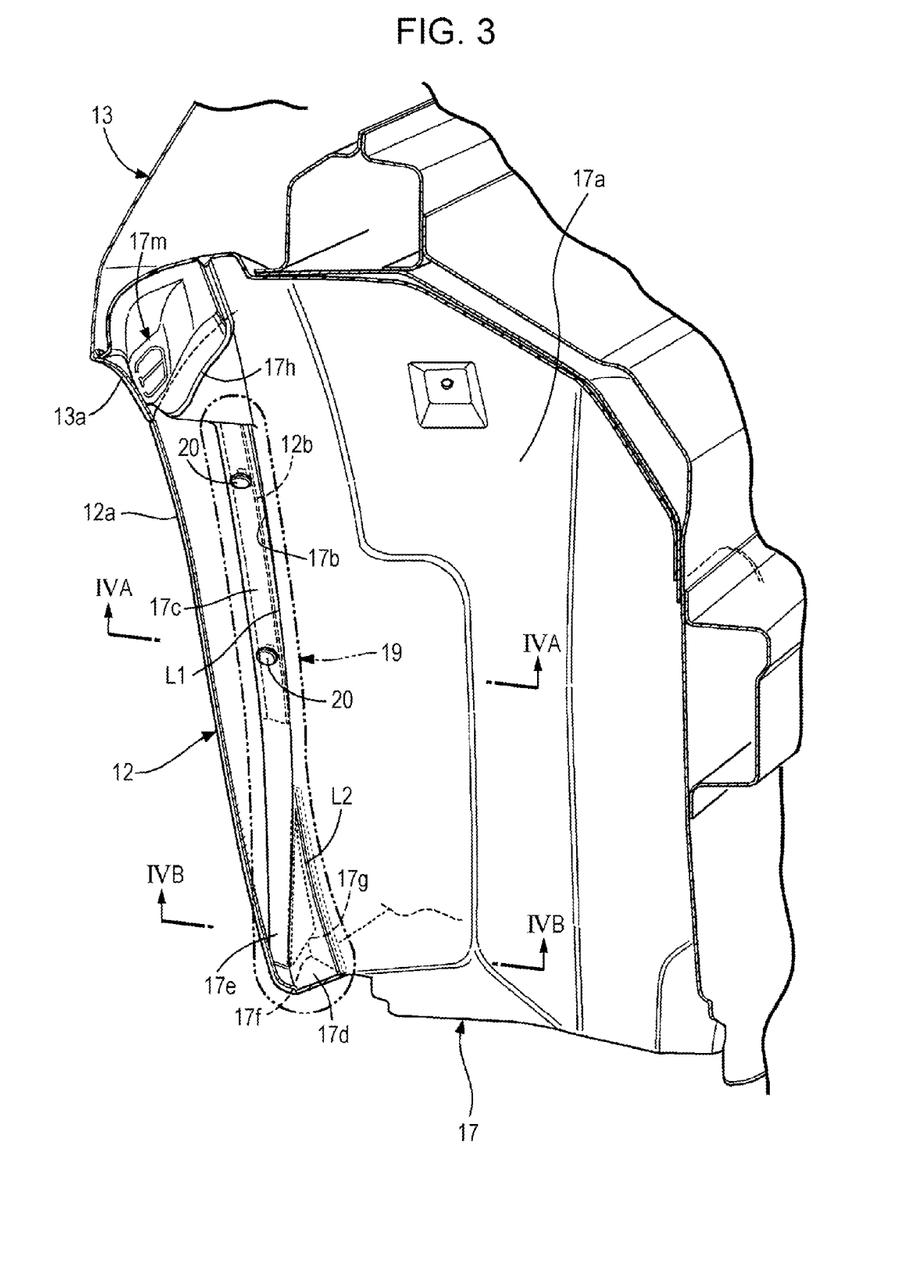
FIG. 3 is a sectional view of a structure illustrated in FIG. 2 taken along line III-III in FIG. 2.
Figure 4A:
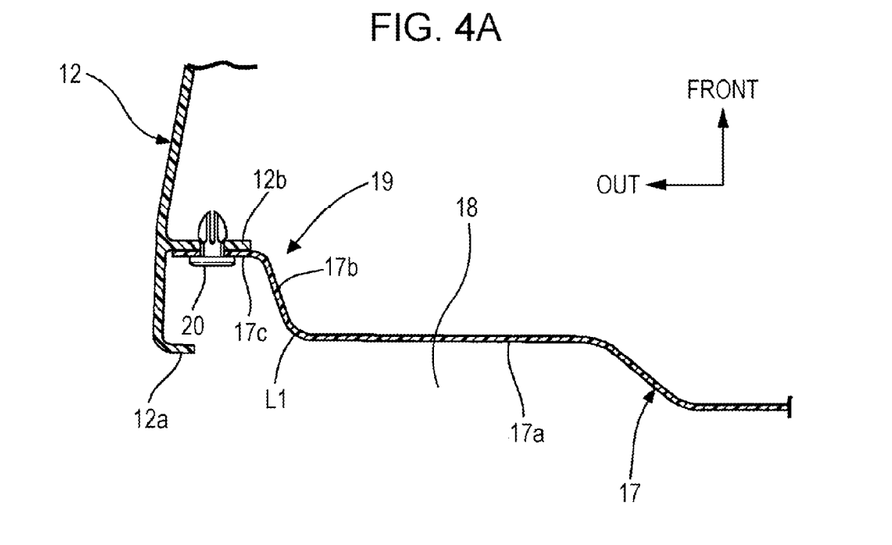
FIGS. 4A and 4B are sectional views of a structure illustrated in FIG. 3 respectively taken along line IVA-IVA and line IVB-IVB in FIG. 3.

Next, the shape of the undercut portion 19 in the front portion of the inner fender 17 will be described with reference to FIGS. 3 and 4. The inner fender 17 has an arch-shaped inner peripheral wall 17a opposite to the radially outer peripheral surface of the tire 11. The undercut portion 19 is formed on an outer side of the inner peripheral wall 17a with respect to the vehicle width direction. The undercut portion 19 has upper and lower parts. As illustrated in FIG. 4A, the upper part of the undercut portion 19 has an upper side wall 17b and an upper flange 17c. The upper side wall 17b extends forward from an upper ridge L1 formed at an outer end of the inner peripheral wall 17a in the vehicle width direction. The upper flange 17c extends further outward in the vehicle width direction from a front end of the upper side wall 17b. The upper flange 17c is secured to a rib 12b, which protrudes from an inner surface of the bumper face 12, with clips 20.

Figure 4B:
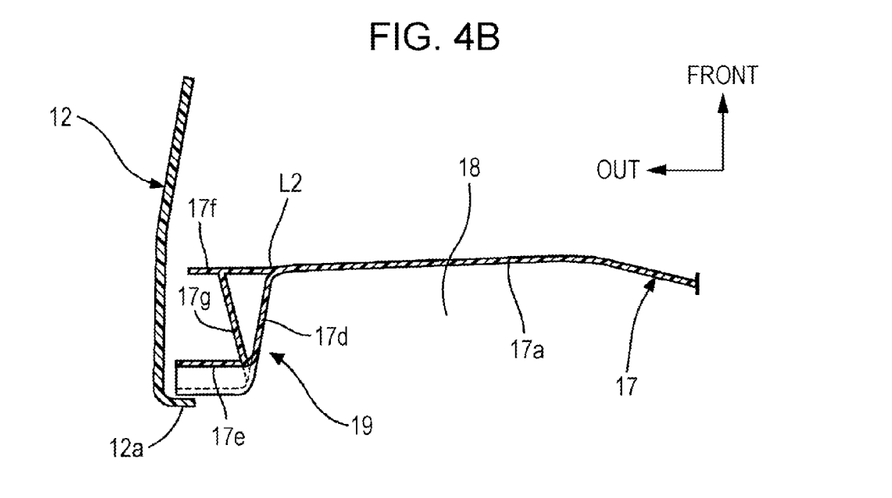

As illustrated in FIG. 4B, the lower part of the undercut portion 19 has a lower side wall 17d, a lower flange 17e, an extended wall 17f, and a triangle reinforcing rib 17g. The lower side wall 17d extends rearward from a lower ridge L2 formed at the outer end of the inner peripheral wall 17a in the vehicle width direction. The lower flange 17e extends outward in the vehicle width direction from a rear end of the lower side wall 17d. The inner peripheral wall 17a extends outward in the vehicle width direction beyond the lower side wall 17d so as to form the extended wall 17f. The reinforcing rib 17g connects a rear surface of the extended wall 17f to a front surface of the lower flange 17e. Thus, as illustrated in an enlarged view in FIG. 2, a line passing along the upper flange 17c and the lower flange 17e and a line passing along the inner peripheral wall 17a (upper ridge L1) and the extended wall 17f (lower ridge L2) intersect each other at an intersection "A" so as to form an X-shape.

Figure 5:
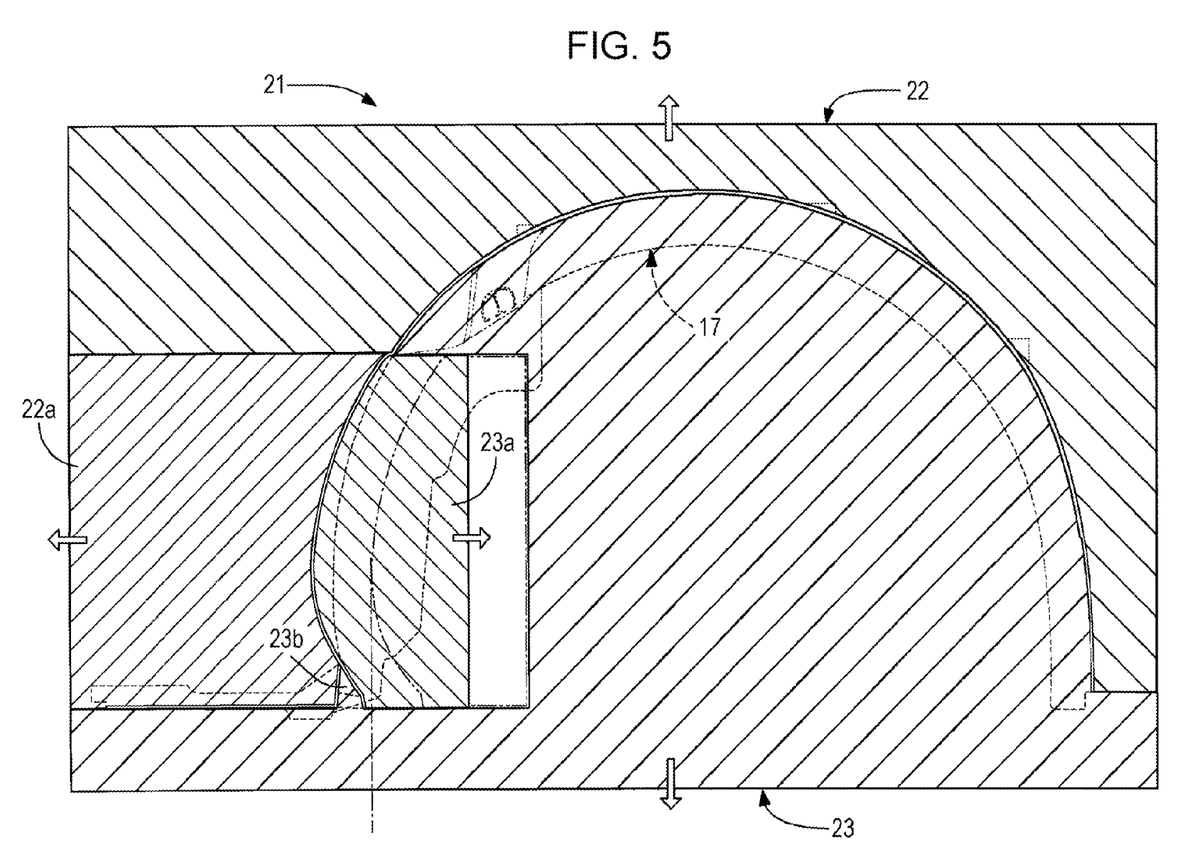
FIG. 5 illustrates a mold used to form an inner fender by injection molding.

FIG. 5 illustrates a mold 21 used to form the inner fender 17 by injection molding. The mold 21 includes an upper half 22 and a lower half 23. The upper half 22 includes a first slide core 22a that is slidable forward from its closed position. The lower half 23 includes a second slide core 23a that is slidable rearward from its closed position. Herein, the terms "forward" and "rearward" referring to the directions of the mold correspond to the respective directions of the inner fender on the vehicle. The first slide core 22a and the second slide core 23a are used to form the undercut portion 19 of the inner fender 17. As can be clearly seen from FIGS. 4A and 4B, the first slide core 22a is used to form an inner surface of the upper side wall 17b with respect to the vehicle width direction, a front surface of the upper flange 17c, and a front surface of the extended wall 17f. The second slide core 23a is used to form an outer surface of the upper side wall 17b with respect to the vehicle width direction, a rear surface of the upper flange 17c, an inner surface of the lower side wall 17d with respect to the vehicle width direction, and a rear surface of the lower flange 17e. The lower half 23 has a protrusion 23b, which enters a space formed by the first slide core 22a and the second slide core 23a, thereby forming the rear surface of the extended wall 17f, the front surface of the lower flange 17e, an outer surface of the lower side wall 17d with respect to the vehicle width direction, and the reinforcing rib 17g.

As described above, since the inner fender 17 has the undercut portion 19 formed therein, the upper half 22 and lower half 23 of the mold 21 without the first and second slide cores 22a and 23a could not be opened in up-down directions. According to the present embodiment, the upper half 22 includes the first slide core 22a that is slidable forward, and the lower half 23 includes the second slide core 23a that is slidable rearward. Since the upper and lower halves 22 and 23 are opened in the up-down directions after the first and second slide cores 22a and 23a have been slided and opened in a front-rear directions, the undercut portion 19 can be molded without problems.

Figure 7A:
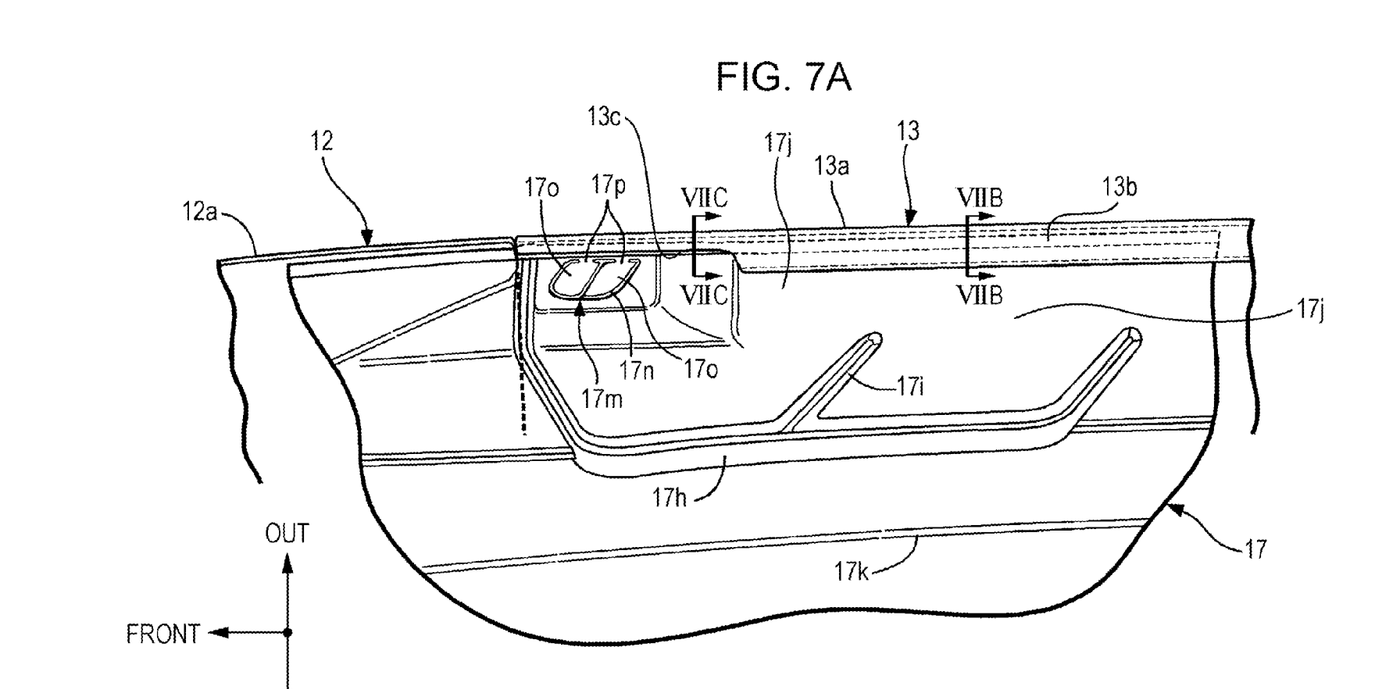
FIG. 7A is a diagram of the structure illustrated in FIG. 2 seen from a direction indicated by an arrow VII in FIG. 2, and FIGS. 7B and 7C are sectional views taken along lines VIIB-VIIB and VIIC-VIIC, respectively.
Figure 8:
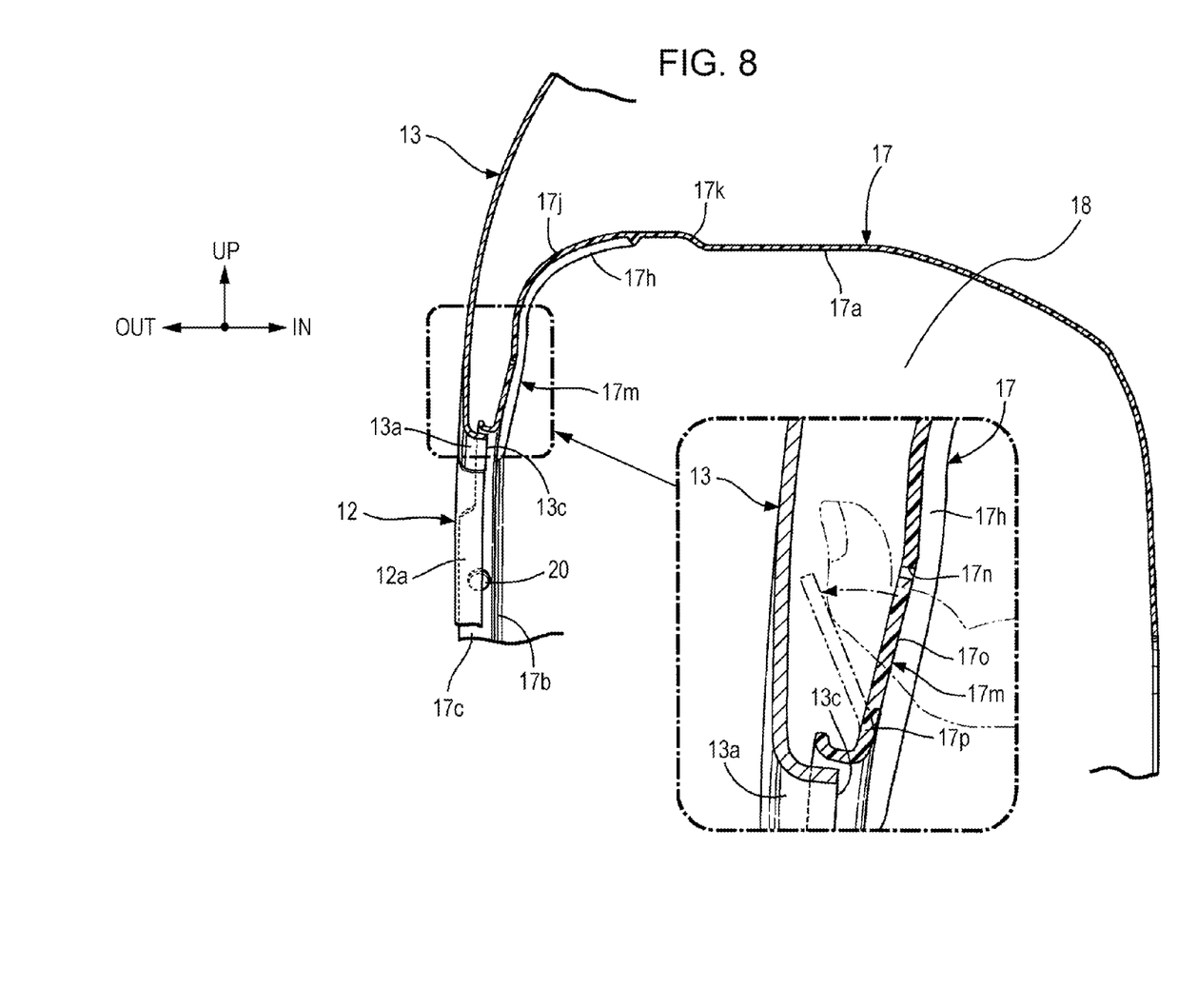
FIG. 8 is a sectional view of the structure illustrated in FIG. 2 taken along line VIII-VIII in FIG. 2.

As illustrated in FIGS. 2, 7A, and 8, a C-shaped first bead 17h is formed in a portion in which the inner fender 17 faces a front portion of the wheel arch 13a of the fender panel 13. Each end of the first bead 17h extends toward the wheel arch 13a of the fender panel 13, and an elastically deformable openable area 17j is set in an area inside the first bead 17h. An I-shaped second bead 17i is formed in an area inside the first bead 17h. The first bead 17h together with the second bead 17i forms an E-shaped bead. A ridge 17k, which extends in a circumferential direction of the inner fender 17, is formed at a position adjacent to the first bead 17h on the inner side of the first bead 17h with respect to the vehicle width direction.

A finger hook 17m is formed at a front end of the openable area 17j at a position near the wheel arch 13a of the fender panel 13. The finger hook 17m is structured such that tongues 17o, which are formed of two pieces separated and surrounded by an ε-shaped slit portion 17n, are openably supported by resin hinges 17p. Since the inner fender 17 is formed of a soft synthetic-resin, the resin hinges 17p are functional due to the elasticity the synthetic-resin itself has. The finger hook 17m is arranged such that the resin hinges 17p are located on a lower side and the slit portion 17n is located on an upper side.

Figure 7B:
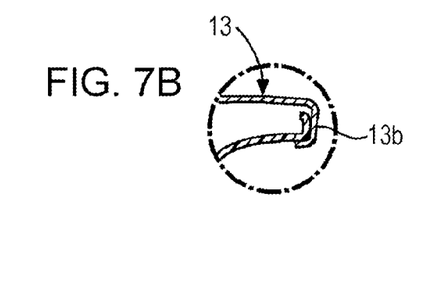
Figure 7C:
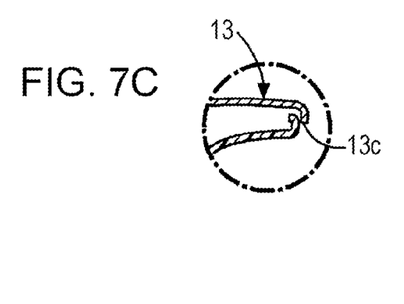

As illustrated in FIG. 7B, an outer end edge of the inner fender 17 with respect to the vehicle width direction is engaged with a flange 13b of the wheel arch 13a of the fender panel 13. However, as illustrated in FIG. 7C, part of the flange 13b is cut near the finger hook 17m so as to form a flange cut portion 13c.

Next, operation of the embodiment of the present application having the above-described structure will be described.

The undercut portion 19 of the inner fender 17 has the lower side wall 17d. Thus, as illustrated in FIG. 6A, when the wheel housing 18 is seen from a diagonally rearward direction, the lower side wall 17d of the inner fender 17 is superposed with a surface of a lower end of the wheel arch 12a of the bumper face 12, the surface being an inner surface with respect to the vehicle width direction. Thus, the lower end of the wheel arch 12a of the bumper face 12 has a thick appearance, and accordingly, the appearance thereof is improved. In a comparative example illustrated in FIG. 6B, the inner fender 17 does not have the lower side wall 17d, and accordingly, a thin edge of the lower end of the wheel arch 12a of the bumper face 12 is exposed. This degrades the appearance.

Furthermore, the upper side wall 17b of the undercut portion 19 of the inner fender 17 is spaced apart from and in front of the wheel arch 12a of the bumper face 12. The upper flange 17c, which is bent outward in the vehicle width direction at the front end of the upper side wall 17b, is secured to the rib 12b of the bumper face 12 with the clips 20, and accordingly, the positions of the clips 20 are separated from and in front of the wheel arch 12a. Thus, it is unlikely that the clips 20 will be visible through the wheel housing 18, thereby further improving the appearance.

The undercut portion 19 has the upper ridge L1 and the lower ridge L2 that are continuous with each other in the up-down direction. In addition, the upper side wall 17b extends forward from the upper ridge L1 and the lower side wall 17d extends rearward from the lower ridge L2. Thus, due to the upper ridge L1 and the lower ridge L2, the stiffness of the undercut portion 19 is increased. This can suppress the shift of the position of the lower side wall 17d relative to the lower end of the wheel arch 12a of the bumper face 12.

The stiffness of the undercut portion 19 is also increased by the triangle reinforcing rib 17g, which connects the rear surface of the extended wall 17f to the front surface of the lower flange 17e. The reinforcing rib 17g is continuous with an area near the lower ridge L2 (see FIG. 4B). Thus, the lower ridge L2 can decrease the visibility of depression of the molded product when resin is cured due to the reinforcing rib 17g formed.

In order to perform maintenance such as replacement of a bulb of the headlight 16, removal of the inner fender 17 is no longer necessary. Maintenance such as replacement of the bulb of the headlight 16 is performed by opening the openable area 17j of the inner fender 17 inward and by inserting a hand into a gap α formed between the wheel arch 13a of the fender panel 13 and the openable area 17j. This can significantly improve maintainability.

Figure 9:
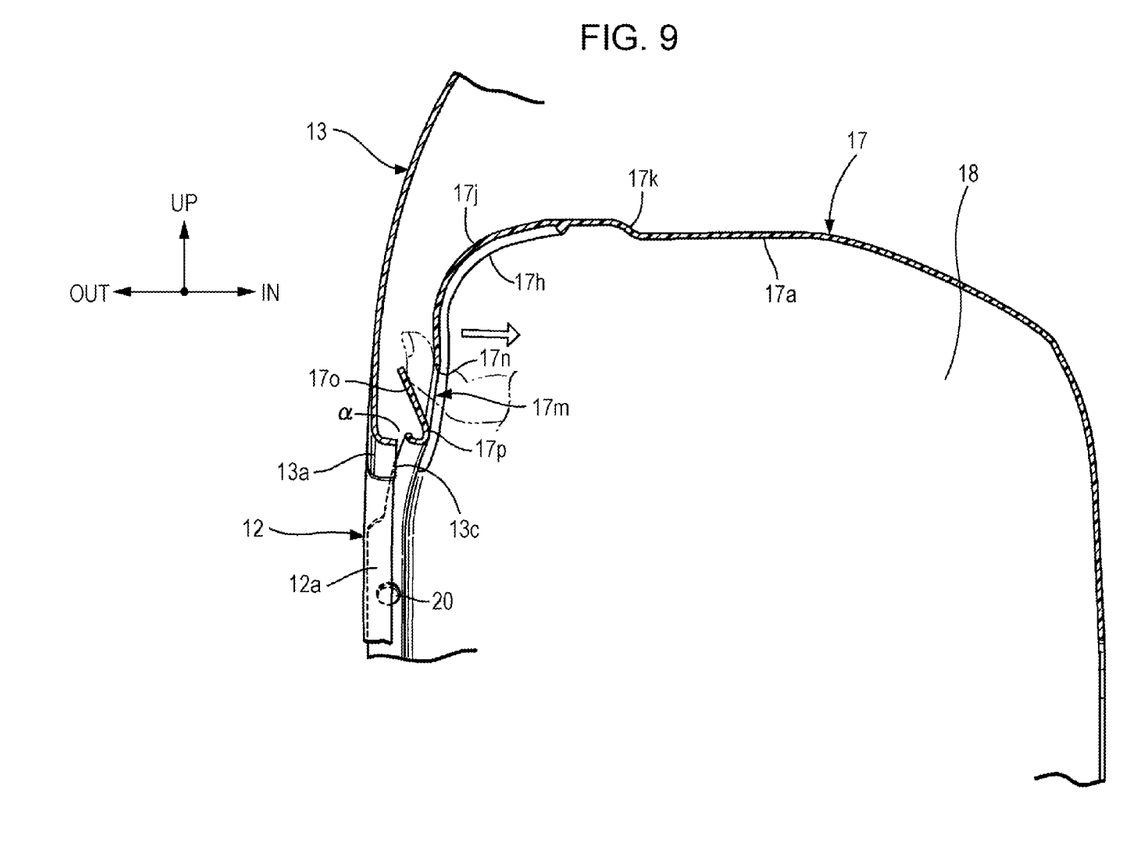
FIG. 9 illustrates operation of a structure illustrated in FIG. 8.
Figure 10:
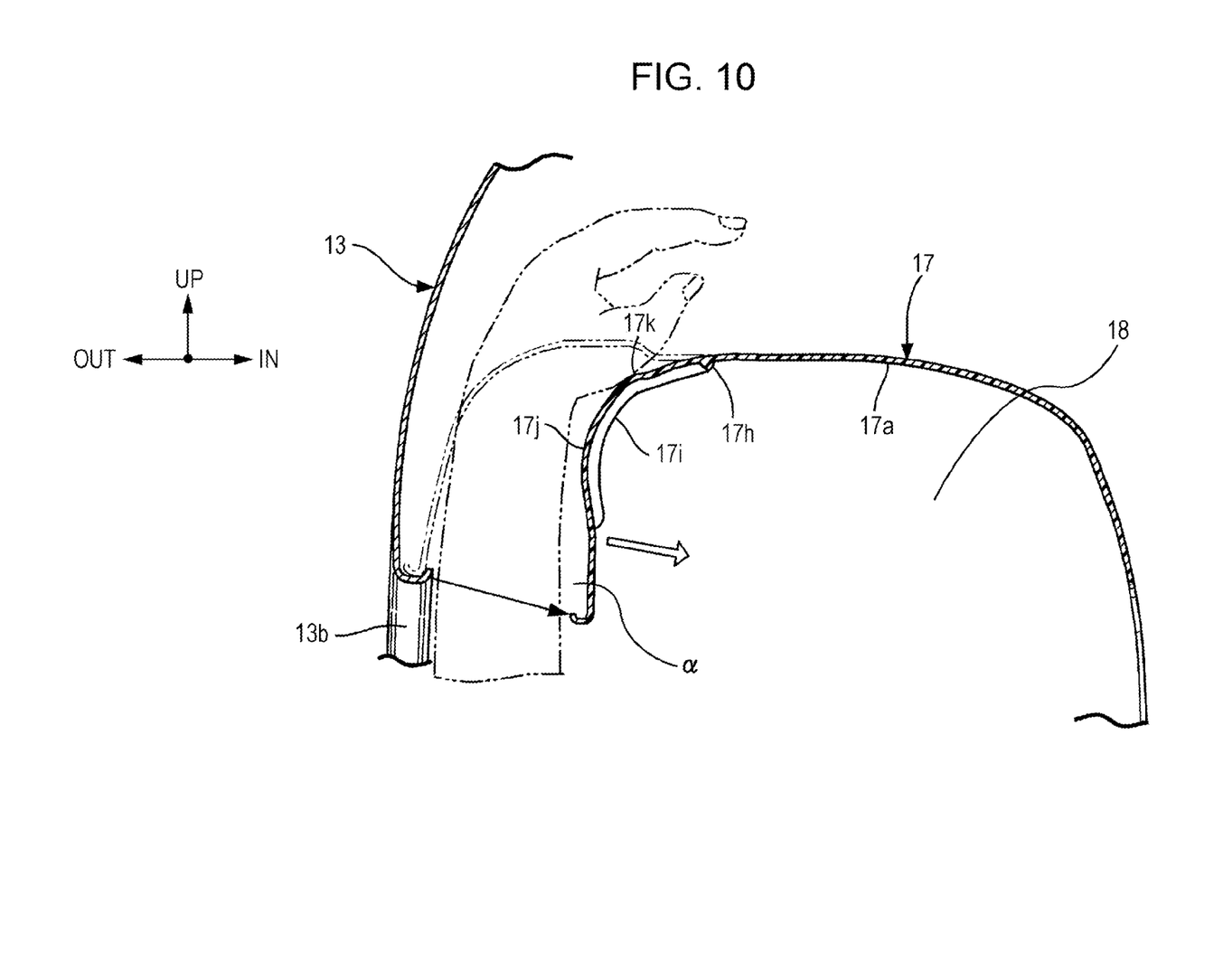
FIG. 10 is a sectional view of the structure illustrated in FIG. 2 taken along line X-X in FIG. 2.
Figure 11A:
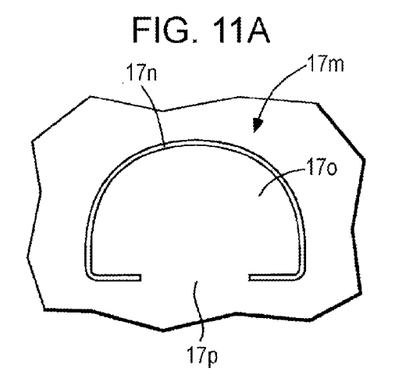
FIG. 11 illustrates other embodiments of a finger hook.
Figure 11B:
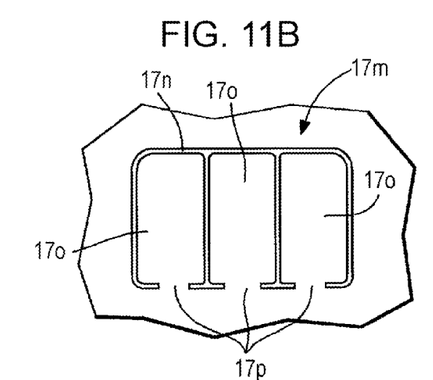
Figure 11C:
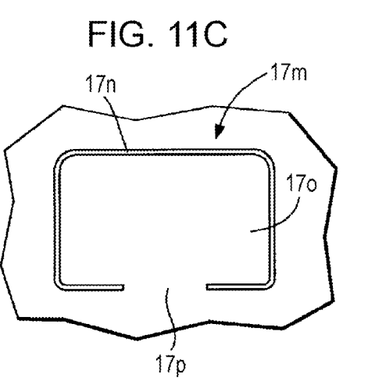
Figure 11D:
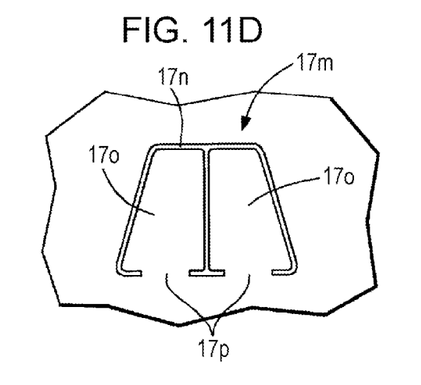
Figure 11E:
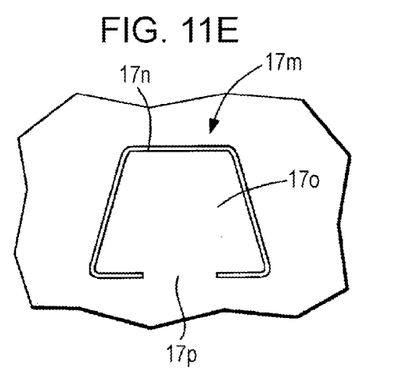

To do this, an automobile is initially jacked up, a hand of an operator is inserted into the wheel housing 18, and as illustrated in an enlarged view in FIG. 8, the tongues 17o of the finger hook 17m are pressed by the fingers so as to open the tongues 17o outward about the resin hinges 17p. Then, as illustrated in FIG. 9, the fingers are hooked in the slit portion 17n of the finger hook 17m and the finger hook 17m is pulled inward in the vehicle width direction. An outer edge of the openable area 17j of the inner fender 17 in the vehicle width direction is removed from the flange cut portion 13c of the wheel arch 13a of the fender panel 13. Starting from the removal of the outer edge, the entire openable area 17j is opened from the wheel arch 13a of the fender panel 13, thereby forming a gap α. Thus, as illustrated in FIG. 10, the operator can insert the hand into the gap α so as to perform maintenance such as replacement of the bulb of the headlight 16.

When the tongues 17o of the finger hook 17m are pressed to open by the fingers, the fingers are hooked in the slit portion 17n, and the slit portion 17n is pulled inward in the vehicle width direction (see FIG. 9). Thus, due to the arrangement in which the resin hinges 17p are located on a front side and the slit portion 17n is located on a rear side with respect to a direction of finger insertion, a situation in which the fingers are firmly pressed against edges at the ends of the tongues 17o is suppressed. This improves work efficiency.

When the openable area 17j is opened, since the finger hook 17m is formed at the end of the openable area 17j, the openable area 17j is gradually opened from the end side thereof where the finger hook 17m is formed toward the opposite end side thereof. Thus, the openable area 17j can be opened so as to form a gap α for operation with a small amount of force.

Since the flange cut portion 13c, which is formed by cutting part of the flange 13b of the fender panel 13, is formed near the finger hook 17m, when the fingers are hooked in the finger hook 17m to pull the finger hook 17m, the inner fender 17 can be easily removed from the fender panel 13 so as to form the gap α.

Since the inner fender 17 has the C-shaped first bead 17h that surrounds the openable area 17j, forces that open the openable area 17j can be effectively concentrated in an area inside the first bead 17h, thereby improving work efficiency. The inner fender 17 has the ridge 17k on the inner side of the openable area 17j with respect to the vehicle width direction. Thus, the ridge 17k improves the stiffness of an area outside the openable area 17j, thereby allowing the forces that open the openable area 17j to be more effectively concentrated in the openable area 17j.

In addition, the inner fender 17 has the second bead 17i, which divides the openable area 17j into two portions, and the first bead 17h together with the second bead 17i forms an E-shaped structure. As a result, forces exerted on part of the openable area 17j are transferred to the entire openable area 17*j* by the second bead 17*i*, thereby allowing the openable area 17*j* to be efficiently opened.

A second embodiment of the present application will be described below with reference to FIG. 11.

The finger hook 17*m* of the inner fender 17 may have any of a variety of shapes as illustrated in FIG. 11 as long as the finger hook 17*m* has the tongue 17*o* surrounded by the slit portion 17*n* and the resin hinge 17*p*.

Although the embodiments of the present application have been described above, a variety of design changes may be made to the embodiments of the present application without departing from the gist of the present application.

For example, the bumper face 12 and the inner fender 17 on the front side have been described in the embodiments. However, the embodiments of the present application may be applicable to a bumper face and the inner fender on the rear side of the vehicle. Such embodiment will be also covered by the accompanying claims unless otherwise specified.

We claim:

1. A vehicle body structure for an automobile comprising: an inner fender disposed on an inner side of a wheel arch of a bumper face with respect to a vehicle width direction so as to form a wheel housing, the inner fender having an inner peripheral wall opposite to a radially outer peripheral surface of a tire,
   wherein the inner fender includes an undercut portion formed on a side of the inner peripheral wall, the side of the inner peripheral wall being an outer side with respect to the vehicle width direction, and
   wherein the undercut portion includes:
      a lower side wall radially inwardly receding from the inner peripheral wall, the lower side wall being superposed with a lower end of the wheel arch of the bumper face,
      an upper side wall radially outwardly protruding from the inner peripheral wall, the upper side wall being disposed continuously with the lower side wall, and
      a flange extending outward in the vehicle width direction from a front end of the upper side wall, the flange being secured to an inner portion of the bumper face,
   wherein the inner fender further includes first and second ridges extending in a circumferential direction of the wheel housing and formed between the inner peripheral wall and the undercut portion,
   wherein a lower portion of the undercut portion radially recedes further to the inside than the second ridge so as to form the lower side wall, and
   wherein an upper portion of the undercut portion radially protrudes further to the outside than the first ridge so as to form the upper side wall.

2. The vehicle body structure for an automobile according to claim 1,
   wherein the inner fender is formed by injection molding by using a mold, the mold including:
      an upper half used to form an outer peripheral surface of the inner fender, the upper half including a first slide core outwardly slidable from a closed position thereof, and
      a lower half used to form an inner peripheral surface of the inner fender, the lower half including a second slide core inwardly slidable from the closed position thereof, the first and second slide cores being used to form the undercut portion, the outward and inward directions respectively corresponding to forward and rearward directions of the inner fender on a vehicle.

3. The vehicle body structure for an automobile according to claim 1,
   wherein a reinforcing rib is formed on an outer side of the lower side wall with respect to the vehicle width direction, the reinforcing rib extending downward from a position near the second ridge.

4. The vehicle body structure for an automobile according to claim 1,
   wherein the flange is recessed from the inner peripheral wall and spaced apart from the edge of the wheel arch of the bumper face.

* * * * *